350-377 SR
XR 3,651,504 / X4020 W) WP

United Sta[tes Patent]

Goldberg et al.

[15] 3,651,504
[45] Mar. 21, 1972

[54] MAGNETO-OPTIC INFORMATION STORAGE APPARATUS

[72] Inventors: Norman Goldberg, Dresher, Pa.; Roger Newman, Wayland, Mass.

[73] Assignee: Sperry Rand Corporation, New York, N.Y.

[22] Filed: Oct. 17, 1969

[21] Appl. No.: 867,206

[52] U.S. Cl.........................................340/174.1 M, 350/151
[51] Int. Cl.......................................G11c 11/42, G11b 11/10
[58] Field of Search.........................340/174.1 MO; 350/151

[56] References Cited

UNITED STATES PATENTS 3,164,816 1/1965 Chang..................................340/174.1
3,224,333 12/1965 Kock et al...........................340/174.1

OTHER PUBLICATIONS

IBM Tech. Disc. Bul. by E. W. Pugh Vol. 4 No. 8, Jan., 1962 p. 57

*Primary Examiner*—Terrell W. Fears
*Attorney*—Charles C. English, Leonard Zalman and William E. Cleaver

[57] ABSTRACT

A magneto-optic information storage apparatus in which the memory is a wafer of a ferrimagnetic material having a heat-radiating, light-reflecting metallic sheet secured thereto. Following the storage of a bit of binary information at a selected region of the wafer, by simultaneously raising the temperature of the region above the magnetic compensation temperature of the material and exposing the wafer to a magnetic field, the metallic sheet restores quickly the temperature of the region to the compensation temperature. Read-out of information stored at a region of the wafer is enhanced by reflection of the read-out light beam by the metallic sheet whereby the beam makes two excursions through the region.

4 Claims, 1 Drawing Figure

3651504
OR IN 365/122

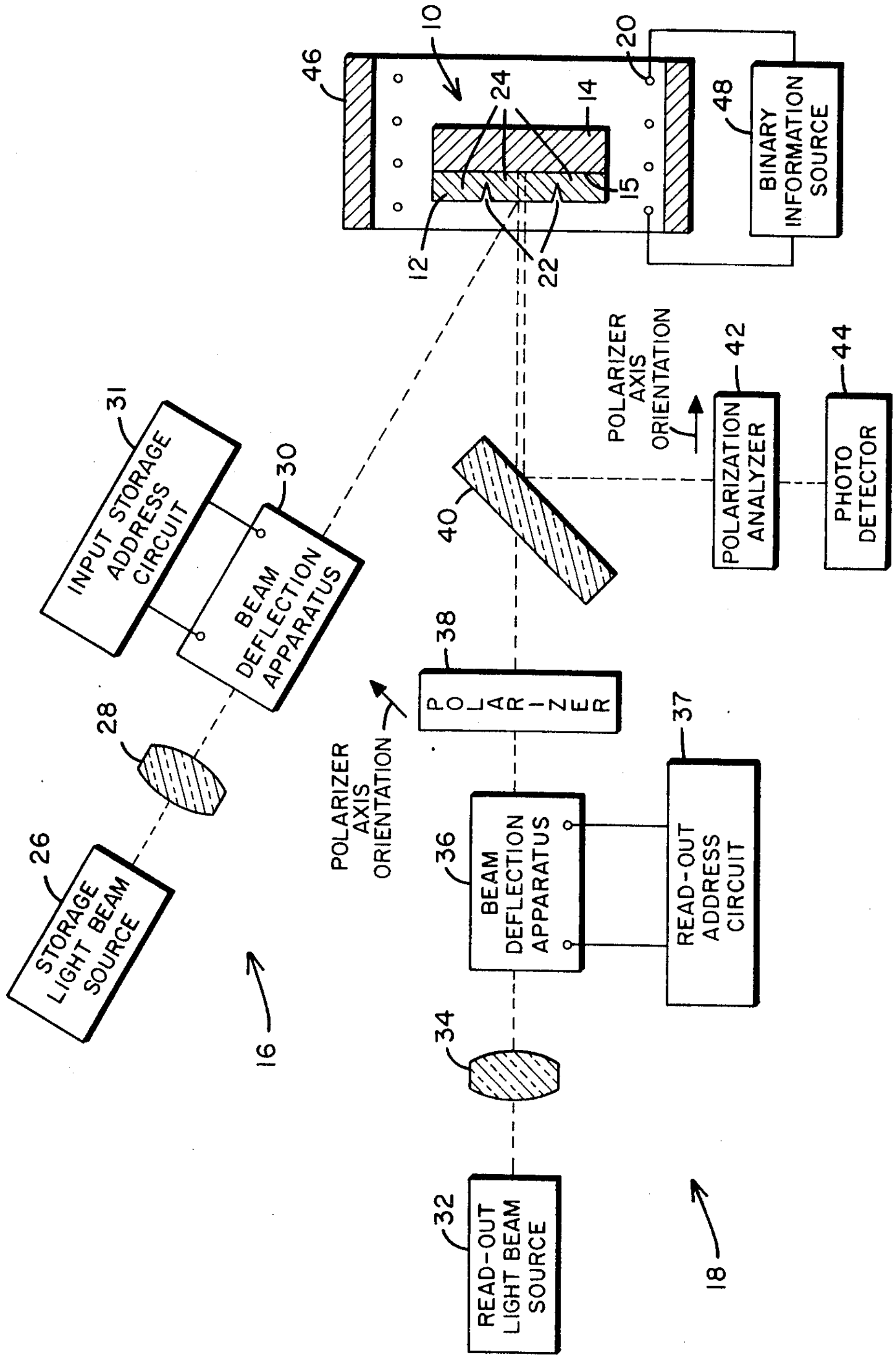
INVENTORS
NORMAN GOLDBERG
ROGER NEWMAN
BY Leonard Zalman
ATTORNEY

MAGNETO-OPTIC INFORMATION STORAGE APPARATUS

A magneto-optic memory has been suggested which utilizes a wafer of ferrimagnetic material having a magnetic compensation temperature. Such a material stores a magnetic bit of information corresponding to a first binary value at a first region thereof, by orientation of the magnetic moment of such region in the direction of an external magnetic field having a direction which corresponds to that binary value, only when the region is heated, by a high intensity light beam, to a temperature above the magnetic compensation temperature of the material. Before a magnetic bit of information corresponding to a second binary value can be stored at another region of the material, by orientation of the magnetic moment of that region in the direction of an external magnetic field having a direction which corresponds to information of the second binary value, the first region must be cooled to about the magnetic compensation temperature. Cooling of any heated region of an support for the wafer of ferrimagnetic material is achieved conventionally by attaching an optically transparent sheet of a non-metallic material having good thermal conductivity, for example, sapphire, to the wafer of ferrimagnetic material.

Read-out of stored information from a selected region of the wafer of ferrimagnetic material is achieved conventionally by projecting a low intensity beam of polarized light through both the selected region and the optically transparent non-metallic supporting sheet. By observing the sense of the polarization rotation which this beam undergoes by virtue of its passage through the selected region, the binary value of the magnetic bit of information stored at the region is determined.

The memory described heretofore is disadvantageous because of the relatively long time required to return heated regions of the ferrimagnetic material to the magnetic compensation temperature so that information can be stored at other regions of the material. Thus, an information storage apparatus utilizing that memory has a low information storage rate. In addition, the amount of polarization rotation of the read-out light beam produced by the aforedescribed memory is small. Thus, with that memory it is hard to determine the sense of the polarization rotation of the read-out light beam and hence the binary content of stored information.

An object of the present invention is to provide a magneto-optic memory having an increased information storage rate and an increased information read-out signal.

A further object of the present invention is to provide a magneto-optic memory in which the information storage cycle time is reduced.

A further object of the present invention is to provide a magneto-optic memory in which the polarization rotation signal of the read-out light beam is enhanced.

According to the present invention the wafer of ferrimagnetic material of a magneto-optic memory is secured to an optically reflective sheet of metal having a high thermal conductivity. The metal sheet, by providing a very efficient heat sink for heated regions of the wafer, decreases the time required for the temperature of these regions to return to the magnetic compensation temperature and thereby decreases the information storage cycle time of the target. An additional advantage is inherent in securing the wafer of ferrimagnetic material to a metal sheet. The read-out beam, having experienced a polarization rotation by virtue of its passage through the ferrimagnetic material, is reflected by the metal sheet and passes through the ferrimagnetic material a second time. During this second passage the polarization rotation of the readout beam is increased thereby making easier the detection of the binary content of stored information.

The invention may be understood fully from the following detailed description with reference to the accompanying drawing in which the sole figure is a schematic diagram of a magneto-optic information storage apparatus utilizing a preferred form of the memory of the present invention.

Referring now to the drawing, the information storage apparatus includes a memory 10 comprising a wafer 12 of a ferrimagnetic material and a metallic sheet 14. The system also includes information storage means generally indicated as 16, information retrieval means generally indicated as 18, and magnetic field producing coil 20.

Any optically transparent ferrimagnetic material having a suitable magnetic compensation temperature and subjecting a light beam passing therethrough to a relatively large polarization rotation at the magnetic compensation temperature can be used as wafer 12. Rare earth iron garnets having a such as, temperature below room temperature (70° F.), such as, gadolinium iron garnet (57° F.), terbium iron garnet (−17° F.), dysprosium iron garnet (−63° F.), holmium iron garnet (−121° F.), and erbium iron garnet (−308° F.), are suitable ferrimagnetic materials for wafer 12. Aluminum oxide can be added to the aforementioned iron garnets to raise their magnetic compensation temperature if it is desirable to maintain them at that temperature by a regulated oven rather than a regulated refrigeration unit. Wafer 12 is thin enough for light to pass therethrough, typically about 0.001 inch thick.

Grooves 22 divide wafer 12 into a plurality of discrete storage regions 24. As a representative example, each region 24 can be a square having sides about 0.001 inch long. Alternatively, a continuous wafer without grooves might provide discrete storage regions provided a sufficient energy barrier is maintained between these storage regions.

Sheet 14 can be any metal having a high thermal conductivity and a high optical reflectivity such as, for example, aluminum, chromium, gold, or silver. The surface 15 of sheet 14 in contact with wafer 12 can be polished by any known suitable method to increase its optical reflectivity. The advantage of this is discussed in detail hereinafter. Sheet 14 is typically about 0.0015 inch thick and is secured to wafer 12 in any suitable conventional manner.

Information is stored on regions 24 by information storage means 16 which comprises, in the order mentioned, a signal-controlled light source 26, a focusing lens 28, and a light beam deflection apparatus 30 which, in response to a control signal from input storage address circuit 31, directs the light beam from source 26 at a selected one of the regions 24. Light source 26 can be any conventional structure which produces a high intensity light beam, for example, a laser. Deflection apparatus 30 can comprise a plurality of serially arranged electro-optic crystals (not shown), for example, potassium diphosphate crystals, inter-leaved with birefringent crystals (not shown), for example, calcium carbonate crystals.

Information read-out means 18 includes, in the order mentioned, a signal-controlled light source 32, which generates a light beam of lower intensity than the intensity of the light beam generated by source 26 since it is not desirable to heat significantly the wafer 12 during read-out, a focusing lens 34, light beam deflection apparatus 36 and a polarizer 38. Apparatus 36, which can be similar to apparatus 30, directs, in response to a signal from read-out address circuit 37, the light beam from source 32 at a selected one of the regions 24 of wafer 12. Polarizer 38, which can be of a conventional construction, linearly polarizes the light beam from source 32 to provide a reference plate from which to measure the polarization rotation of the read-out light beam. This reference plane is illustrated in the drawing as extending at 45° to the horizontal direction.

Read-out means 18 also includes a half-silvered mirror 40, a polarization analyzer 42, and a photo-detector 44, all of conventional construction. Analyzer 42 transmits substantially complete light energy reflected thereon by mirror 40 of one polarization, illustrated in the drawing as the horizontal direction, and attenuates in a varying degree light energy incident thereon of other polarizations. Photo-detector 44 produces an electrical signal having a magnitude directly proportional to the intensity of the light energy incident thereon. Due to analyzer 42 this electrical signal is in binary form and hence the output signal of the information storage apparatus is suitable for utilization by the arithmetic of a conventional digital computer.

Cooling apparatus generally illustrated as 46 maintains wafer 12 at about its magnetic compensation temperature. Apparatus 46 may consist of a refrigeration unit and cooling coils for cooling a suitable refrigerant, means for pumping the refrigerant through the refrigeration unit and the cooling coils, and a thermostat for regulating the flow of refrigerant. If the magnetic compensation temperature of the material of wafer 12 is above room temperature, the magnetic compensation temperature is maintained at the surface of wafer 12 by an oven having, for example, non-inductive heating coils.

Magnetic field producing coil 20 produces, in response to a signal from binary information source 48, a uniform magnetic field through wafer 12. The signal from source 48 has either a first polarity corresponding to a first binary value or a second polarity corresponding to a second binary value. Thus a signal from source 48 corresponding to the first binary value will produce through wafer 12 a magnetic field oriented in a first direction and a signal from source 48 corresponding to the second binary value will produce through wafer 12 a magnetic field oriented in a direction opposite to the first direction.

To store information corresponding to one binary value at selected regions of wafer 12, coil 20 is energized by source 48 and the light beam from source 26 is directed successively onto the selected regions. The light beam increases the temperature of the selected regions to above the magnetic compensation temperature. As a result of this increase in temperature, which generally need not be more than 10° F., each of the selected regions is magnetized in the direction of the field produced by coil 20. Since the selected regions remain magnetized when these regions are cooled to about the magnetic compensation temperature, a magnetic bit of information corresponding to the one binary value is stored at each of the selected regions. Following cooling of the selected regions to about the magnetic compensation temperature, the polarity of the signal from source 48 is reversed and other regions 24 of wafer 12 are heated to magnetize these regions in the direction of the field produced by this signal and then cooled to store at each of these regions a magnetic bit of information corresponding to the other binary value.

From the foregoing is is apparent that the speed with which information can be stored on wafer 12 is determined substantially by the time required to cool a region 22 of wafer 12 after the temperature of that region has been increased by the writing beam. By employing the metal support sheet 14 of the present invention the cooling rate of regions 22 is increased greatly relative to the cooling rate that these regions would have if a conventional non-metallic support plate was used. Applicants believe that, due to the increased cooling rate of their target, information can be stored on their target at about twice the rate as on a conventional magneto-optic target.

During read-out a low intensity light beam, generated by source 32 and polarized by polarizer 38, is directed at one of the regions 24. When a magnetic bit of binary information s stored at that region, the plane of polarization of the light beam is rotated as a result of the Faraday magneto-optic effect. The plane of polarization will be rotated either in one sense or the other sense depending upon whether the region was magnetized by a magnetic field having a direction corresponding to information of one binary value or the other binary value.

As clearly shown by the drawing, the read-out beam, after passing through wafer 12 is reflected back through wafer 12 by surface 15 of metal sheet 14. Due to this reflection, the read-out beam once again passes through wafer 12 and the plane of polarization of the beam is once again rotated by the Faraday magneto-optic effect. For clarity, the reflected beam is shown offset slightly. Since the polarization rotation of the read-out beam is in the same sense for light traversing in either direction a region 24 of wafer 12 magnetized in a given direction, the double exposure of the read-out beam to a magnetized region 24 increases the polarization rotation of the read-out light beam. This increased polarization rotation renders more accurate the detection of the direction of polarization rotation and hence the binary value of stored information.

While the invention has been described with reference to a particular embodiment thereof, various modifications can be made without departing from the invention. For example, sheet 14 can be a lamination of several thin metal sheets. Furthermore, sheet 14 can be made larger than wafer 12 or can be provided with cooling fins to increase its heat radiating efficiency.

In addition, the high intensity storage beam and the low intensity readout beam could be generated by a single source. This embodiment of the storage apparatus requires only one beam deflection apparatus coupled both to an appropriate storage address circuit and an appropriate readout address circuit. Accordingly, we desire the scope of our invention to be limited only by the appended claims.

We claim:

1. In a magneto-optic information storage device which includes; an optically transparent magnetic wafer having front and back surfaces between which a plurality of storage regions exist, a means external to said wafer including a radiant energy source operable to direct a pulse of heat raising energy to a selected one of said storage regions to momentarily raise the temperature thereof, a means to apply a magnetic field to said wafer during the time said selected storage region is heated by said temperature raising beam, and means to direct a polarized read out light beam to a selected storage region of said wafer; the improvement which comprises, an efficient heat radiating, light reflecting metal sheet secured to the back surface of said wafer, said sheet having the property of rapidly cooling said wafer to its operating temperature following the application of said heat raising radiant energy beam thereto and the further property of efficiently reflecting the read out light beam back through said selected region to thereby double the rotation of the plane of polarization of the light beam.

2. The device of claim 1 wherein said metal sheet is selected from the group consisting of aluminum, silver, chromium and gold.

3. The device of claim 1 wherein said sheet is laminated.

4. The device of claim 1 wherein the surface of said sheet secured to said wafer is polished to provide an improved light reflecting surface therefor.

* * * * *